UNITED STATES PATENT OFFICE.

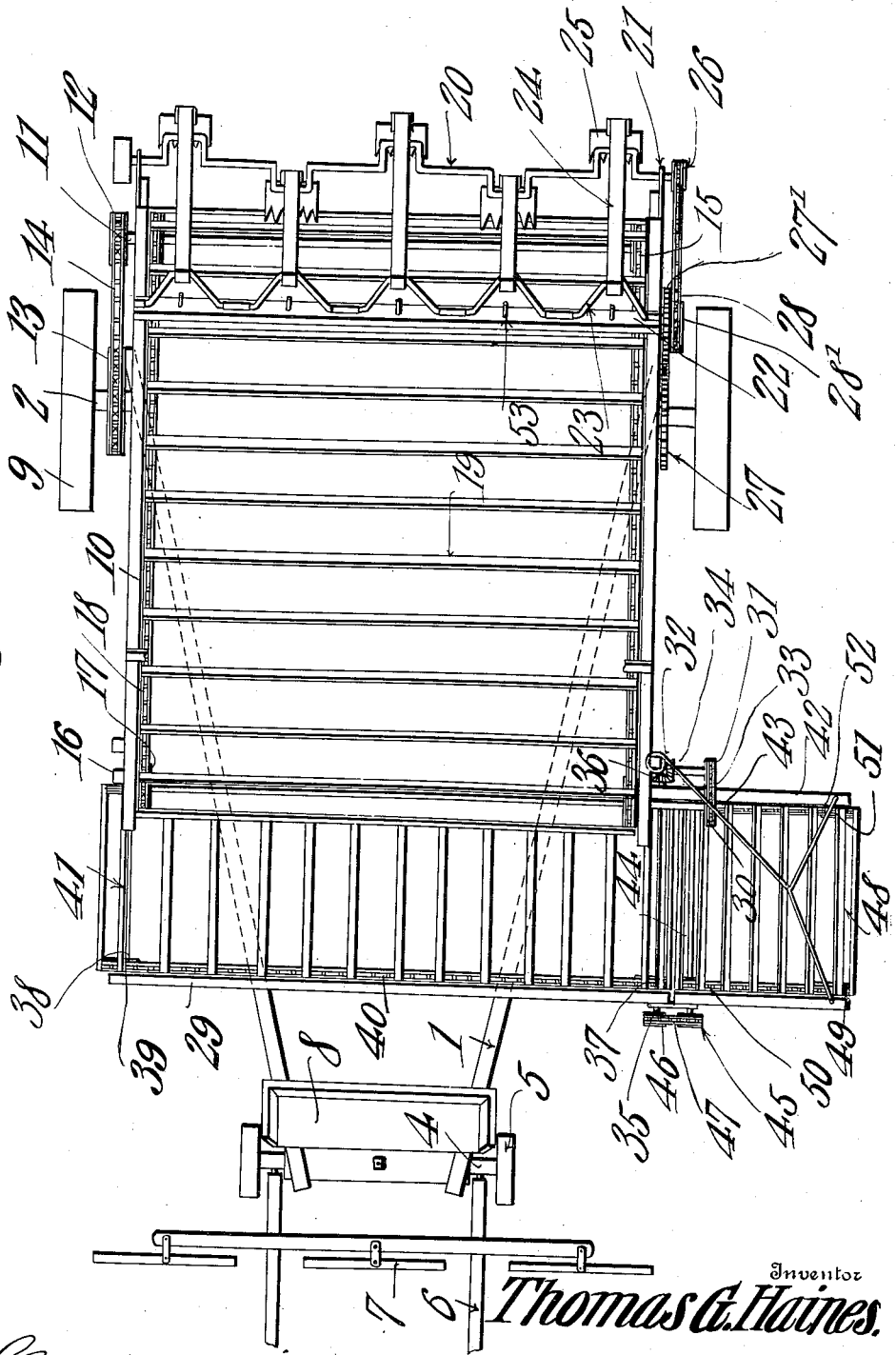

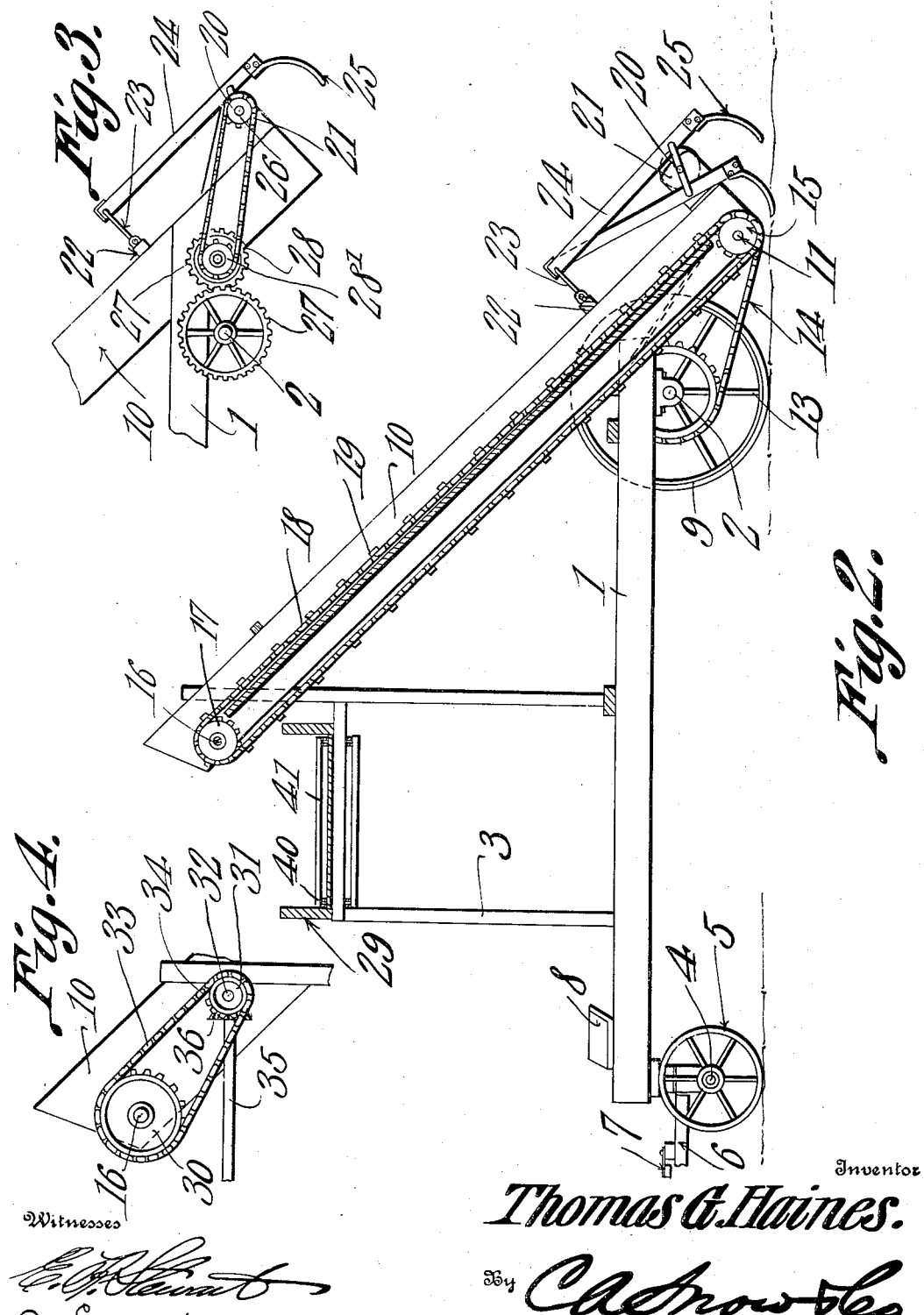

THOMAS G. HAINES, OF SPRINGDALE, WASHINGTON.

HAY-LOADER.

968,656.

Specification of Letters Patent.  Patented Aug. 30, 1910.

Application filed March 10, 1910.  Serial No. 548,430.

*To all whom it may concern:*

Be it known that I, THOMAS G. HAINES, a citizen of the United States, residing at Springdale, in the county of Stevens and State of Washington, have invented a new and useful Hay-Loader, of which the following is a specification.

This invention has relation to hay loaders and it consists in the novel construction and arrangement of its parts as hereinafter shown and described.

The object of the invention is to provide a hay loader adapted to be drawn by draft animals the parts being so arranged that the animals may be hitched abreast in advance of the loader, and the forward portion of the loader is mounted upon a pivoted axle, whereby short turns may be effected.

With the above object in view, the loader comprises a wheel mounted frame upon the rear portion of which is mounted an elevating trunk which is upwardly disposed toward its forward end. An endless conveyer is mounted for movement along said trunk and gathering rakes are arranged for movement behind the lower end of the said trunk and are adapted to deliver the hay to the said conveyer. A trunk is mounted at the forward portion of the frame and extends transversely of the first said trunk and is located below the delivery end thereof. An endless conveyer is mounted for movement along the last said trunk and a pivoted trunk is attached to one end of the last said trunk and an endless conveyer is mounted for movement along the same. The said conveyers are operated from the rear supporting wheels of the frame as are also the gathering rakes.

In the accompanying drawing, Figure 1 is a top plan view of the hay loader. Fig. 2 is a vertical longitudinal sectional view of the same. Fig. 3 is a detailed side elevation of a portion of the same. Fig. 4 is a detailed view of means for transmitting movement from the conveyer in the elevating trunk to the conveyers in the other trunks.

The frame of the hay loader includes side bars 1 which are mounted at their rear ends upon an axle 2 and which converge toward each other at their forward ends. The frame also includes a super-structure 3 which is mounted upon the forward or intermediate portions of the side bars 1. The forward portion of the frame of the loader is mounted upon a pivoted axle 4 which in turn is supported by ground wheels 5. Shafts or tongues 6 are connected with the axle 4 and are equipped with draft appliances 7 of any desired pattern. An operator's seat 8 is mounted upon the forward portions of the side bars 1. Traction wheels 9 are mounted upon the end portions of the rear axle 2 and are adapted to transmit rotary movement to the same.

An inclined trunk 10 is mounted upon the rear portion of the frame of the loader and the forward end of the said trunk is upwardly disposed. A shaft 11 is journaled for rotation at the lower rear end of the trunk 10 and is provided upon one end with a sprocket wheel 12. A sprocket wheel 13 is fixed to the axle 9 and a sprocket chain 14 passes around the sprocket wheels 12 and 13 and is adapted to transmit rotary movement from the axle 2 to the shaft 11. Sprocket wheels 15 are fixed to the shaft 11 within the sides of the trunk 10 and a shaft 16 is journaled for rotation at the upper forward end of the said trunk 10, and sprocket wheels 17 are fixed to the shaft 16 between the sides of the said trunk 10. Sprocket chains 18 pass around the sprocket wheels 15 and 17 and cross flaps 19 connect the said chains together transversely of the trunk 10. The chains 18 and cross flaps 19 constitute an endless conveyer the upper run of which is above the bottom of the trunk 10 and the lower run of which is below the bottom of the said trunk.

A crank shaft 20 is journaled for rotation in bearings 21 provided at the lower rear ends of the sides of the trunk 10 and a cross bar 22 is connected at its ends to the sides of the trunk 10. Yokes 23 are pivoted at their ends to the cross bar 22 and rake bars 24 are pivoted at their upper ends to the intermediate portions of the yoke 23 and at their lower portion upon the crank of the shaft 20. Rake heads 25 are carried at the lower ends of the rake bars 24. A sprocket wheel 26 is fixed to one end of the shaft 20 and a gear wheel 27 is fixed to the axle 2. A gear wheel 27' is journaled at the side of the trunk 10 and meshes with the gear wheel 27. A sprocket wheel 28' is fixed to the side of the gear wheel 27'. A chain belt 28 passes around the sprocket wheels 26 and 28' and is adapted to transmit rotary movement from the axle 2 to the crank shaft 20.

A trunk 29 is mounted upon the super-structure 3 and is transversely disposed with relation to the trunk 10 and is located below the delivery end thereof. A sprocket wheel 30 is fixed to one end of the shaft 16 and a sprocket wheel 31 is journaled for rotation upon a pin 32 which is supported upon the super-structure 3. A sprocket chain 33 passes around the sprocket wheels 31 and 30 and is adapted to transmit rotary movement from the shaft 16 to the said wheel 31. A beveled pinion 34 is journaled upon the pin 32 for simultaneous rotation with the sprocket wheel 31. A shaft 35 is journaled for rotation in one end of the trunk 29 and is provided at one end with a beveled pinion 36 which meshes with the beveled pinion 34. Thus it will be seen that means are provided for transmitting rotary movement from the wheel 31 to the shaft 35. Sprocket wheels 37 are mounted upon the shaft 35 within the sides of the trunk 29 and a shaft 38 is journaled for rotation at that end of the trunk 29 opposite the end thereof at which the shaft 35 is journaled and sprocket wheels 39 are mounted upon the shaft 38 within the sides of the trunk 29. Sprocket chains 40 pass around the sprocket wheels 37 and 39 and are connected together by cross slats 41. The said chains 40 and cross slats 41 constitute an endless conveyer the upper run of which is above the bottom of the trunk 29 and the lower run of which is below the bottom thereof. A trunk 42 is hingedly connected with the delivery end of the trunk 29 and a cable 43 or other means are provided for raising and lowering the free end of the trunk 42. A shaft 44 is journaled for rotation at that end of the trunk 43 adjacent the delivery end of the trunk 29 and is provided at one end with a sprocket wheel 45. A sprocket wheel 46 is fixed to the shaft 35 and a sprocket chain 47 passes around the sprocket wheels 45 and 46 and is adapted to transmit rotary movement from the shaft 35 to the shaft 44. A shaft 48 is journaled for rotation at the free end of the trunk 42 and sprocket wheels 49 are mounted upon the shaft 48 within the sides of the trunk 42. Sprocket wheels 50 are mounted upon the shaft 44 within the sides of the trunk 42 and sprocket chains 51 pass around the sprocket wheels 49 and 50. The chains 51 are connected together by cross flaps 52 and the said chains 51 and flaps 52 constitute an endless conveyer the upper run of which is above the bottom of the trunk 42 and the lower run of which is below the bottom of the same. Upstanding pins or fingers 53 are mounted upon the cross bar 22 below the intermediate portions of the yoke 23 and are adapted to prevent hay from accumulating under the intermediate portions of the said yoke and between the said portions and the bar 22.

As the hay loader is drawn along the ground movement is transmitted (in the manner indicated) from the traction wheels 9 to the endless conveyer operating along the trunk 10. At the same time the rake bars 24 are operated by the cranks of the shaft 20 and are guided by the yokes 23 so that the rake heads 25 gather the hay upon the surface of the ground and conduct the same toward the lower end of the conveyer operating in the trunk 10. The hay is caught up by the cross flaps 19 and carried up along the trunk 10 in a forward direction and deposited upon the cross flaps 41 operating in the transversely disposed trunk 29. From the trunk 29 the hay is delivered upon the cross flaps 52 and carried along the trunk 42 and from the delivery end thereof may fall into the body of a wagon which may be drawn over the ground by the side of the loader. By reason of the fact that the forward ends of the side bars 1 of the frame converge toward each other there is sufficient room at the side of the loader to permit a wagon to travel in close proximity to the same and in the same direction and receive the hay from the conveyer 42 in the manner indicated. Again by reason of the fact that the forward ends of the side bars 1 of the frame of the loader converge toward each other and are mounted upon a pivotal axle it is possible to have all of the draft animals used for drawing the loader abreast and in close proximity and therefore they can be controlled by a single operator and may be readily turned in unison so that the loader may be turned in limited space.

Having described the invention what I claim as new and desire to secure by Letters Patent is:

A hay loader comprising a frame having side bars converging toward each other at their forward ends, a relatively short axle pivoted under the forward ends of the side bars, ground wheels journaled at the ends of said axles, a relatively long axle supporting the rear portions of the side bars, traction wheels mounted upon the ends of the last said axle, an upwardly and forwardly inclined trunk mounted upon the frame and having parallel sides whereby the side portions of the elevated end are located considerably beyond the sides of the forward portions of the converging side bars of the frame and at a sufficient height to permit the body of a receiving wagon to pass under the same, a conveyer mounted for movement along said trunk an elevated transversely disposed conveyer located below the delivery end of the first said conveyer, a gathering means for delivering hay to the first said conveyer and means for actuating the first said and transverse conveyers from the traction wheels.

In testimony that I claim the foregoing as my own, I have hereto affixed my signature in the presence of two witnesses.

THOMAS G. HAINES.

Witnesses:
A. E. BIDGOOD,
SYLVIA PIERCE.